(12) United States Patent
Weidinger

(10) Patent No.: US 6,425,470 B2
(45) Date of Patent: Jul. 30, 2002

(54) THRUST PLATE ASSEMBLY

(75) Inventor: Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 27 days.

(21) Appl. No.: 09/734,344

(22) Filed: Dec. 11, 2000

(30) Foreign Application Priority Data

Dec. 10, 1999 (DE) .......................................... 199 64 126

(51) Int. Cl.$^7$ ............................................... F16D 13/75
(52) U.S. Cl. ................................ 192/70.25; 192/111 A; 29/446; 29/469
(58) Field of Search .......................... 192/70.25, 30 W, 192/111 A; 188/196 V; 29/436, 446, 469

(56) References Cited

U.S. PATENT DOCUMENTS

| 5,690,203 A | * | 11/1997 | Link et al. ................. 192/70.25 |
| 5,803,223 A | * | 9/1998 | Thirion De Briel et al. ..... 192/70.25 |
| 5,927,458 A | * | 7/1999 | Weiss et al. .............. 192/70.25 |
| 5,934,429 A | * | 8/1999 | Jennings ................... 192/70.25 |
| 5,988,338 A | * | 11/1999 | Maucher ................... 192/70.25 |
| 6,123,180 A | * | 9/2000 | Weidinger ................ 192/70.25 |

* cited by examiner

Primary Examiner—Richard M. Lorence
(74) Attorney, Agent, or Firm—Cohen, Pontani, Lieberman & Pavane

(57) ABSTRACT

A thrust plate assembly for a motor vehicle friction clutch with automatic wear compensation includes a housing which is connectable to a flywheel for rotation jointly with the flywheel about an axis of rotation and a pressure plate arranged in the housing so that the pressure plate is fixed with respect to rotation relative to the housing and axially displaceable relative to the housing. An energy accumulator is supported between the housing and the pressure plate. A wear adjustment device having first and second adjustment elements is arranged in the support path of the energy accumulator. The first and second adjustment elements are pretensioned relative to one another for effecting a relative adjusting movement. A play sensor arrangement arranged for detecting wear includes a detection element which acts upon the wear adjustment device to prevent a relative adjusting movement of the adjustment elements and a detection portion for interacting with a component that moves relative to the pressure plate when wear occurs. The detection element releases the adjustment elements for effecting the relative adjusting movement when wear occurs by the interaction with the component. A stopping element is arranged for stopping the detection element in its position for releasing the adjustment elements.

24 Claims, 4 Drawing Sheets

THRUST PLATE ASSEMBLY

BACKGROUND OF THE INVENTION

1. Field of the Invention

The present invention is directed to a thrust plate assembly for a friction clutch with automatic wear compensation. The thrust plate assembly includes a housing which is connected or connectable to a flywheel for rotation with the flywheel about an axis of rotation, a pressure plate arranged in the housing so that the pressure plate is fixed with respect to rotation relative to the housing and axially displaceable relative to the housing, an energy accumulator having one side supported at the housing and another side supported at the pressure plate, a wear adjustment device having at least two adjustment elements pretensioned relative to one another for carrying out a relative adjusting movement arranged in the support path of the energy accumulator between the energy accumulator and a first component of one of the housing and pressure plate, and at least one play sensor arrangement for detecting wear including a detection element which acts upon the wear adjustment device to prevent a relative adjusting movement of the adjustment elements and which includes a detection portion that interacts with a second component to detect wear, the second component being displaceable with respect to the pressure plate when wear occurs, and wherein the detection element is movable into a position for releasing the adjustment elements for carrying out the relative adjusting movement when wear occurs by the interaction with the second component.

2. Description of the Related Art

Thrust plate assemblies for friction clutches with automatic wear compensation are known with play sensor arrangements having a detection portion that penetrates an axial through-opening in a pressure plate. The detection portion can easily be tilted in the through-opening and a free end of the detection portion can come into contact with the flywheel. A leaf spring element is fixedly arranged at one end of this detection portion situated at a distance from the flywheel. The leaf spring element extends toward the wear adjustment device and overlaps it so that the wear adjustment device is clamped between the pressure plate and the leaf spring element. Since the leaf spring element is supported at the wear adjustment device, the spring elasticity of the leaf spring causes the detection portion to be tilted in the through-opening and the detection portion is accordingly pretensioned in a friction clamping fit. When wear occurs, the pressure plate moves toward the flywheel causing the detection portion to strike the flywheel. Further movement of the pressure plate causes the detection portion to be displaced with respect to the pressure plate. As a result, the leaf spring element is somewhat relaxed, thereby diminishing its action upon the wear adjustment device. During a subsequent releasing process in which the diaphragm spring releases the wear adjustment device, this wear adjustment device, due to the fact that it is pretensioned for carrying out a wear adjustment movement, executes a wear compensating movement until the pretensioning force of the wear adjustment device for carrying out its wear compensating movement and the counter-force generated by the leaf spring element balance one another.

However, a fundamental problem in the operation of systems of this type is that occurring vibrations or shaking movements can generate a relative vibration between the wear adjustment device and, for example, the pressure plate. It must then be ensured in the disengaged state through the action of the leaf spring element that these vibrations cannot cause the wear adjustment device to be lifted from the pressure plate, which could result in spontaneous execution of a wear adjusting movement. Therefore, it must be ensured that the leaf spring force is sufficiently large to hold the wear adjustment device firmly at the pressure plate in every movement state or operating state. This in turn requires a correspondingly large pretensioning force in the wear adjustment device to pretension the same for carrying out a wear compensating movement. Consequently, these two spring areas or pretensioning areas must finally be overdimensioned with respect to the pretensioning function that is actually to be performed by them.

SUMMARY OF THE INVENTION

It is an object of the present invention to provide a thrust plate assembly for a friction clutch with automatic wear compensation such that the components provided therein for carrying out wear compensation are designed in an optimal manner with respect to their actual function and overcome the problems of the prior art.

According to an embodiment of the present invention, the object is met by a thrust plate assembly for a friction clutch with automatic wear compensation having a housing which is fixed or fixable to a flywheel for rotation with the flywheel about an axis of rotation, a pressure plate arranged in the housing so that the pressure plate is fixed with respect to rotation relative to the housing and axially displaceable relative to the housing, an energy accumulator such as a diaphragm spring having one side supported at the housing and another side supported at the pressure plate, and a wear adjustment device arranged in a support path of the energy accumulator between the energy accumulator and a first component of one of the housing and the pressure plate. The wear adjustment device has first and second adjustment elements which are pretensioned relative to one another for carrying out a relative adjusting movement. The thrust plate assembly further includes at least one play sensor arrangement for detecting wear, wherein the play sensor arrangement comprises a detection element which acts upon the wear adjustment device to prevent a relative adjusting movement of the adjustment elements. The detection element also includes a detection portion arranged for interacting with a second component for detection of wear. The second component is displaceable with respect to the pressure plate when wear occurs. The detection element can be brought into a position for releasing the adjustment elements for carrying out the relative adjusting movement when wear occurs by the interaction with the other component.

The thrust plate assembly according to the present invention further includes a stopping element for stopping the detection element in its position for releasing the adjustment elements. Moreover, the detection element has a first application area for acting upon the first adjustment element and a second application area for acting upon the second adjustment element, wherein the adjustment elements are prevented from carrying out the relative adjusting movement when the first adjustment element and the second adjustment element are acted upon by the respective application portions.

An essential characteristic of the thrust plate assembly according to the present invention is that the detection element alone blocks of the wear adjustment device for preventing an unwanted relative adjusting movement, i.e., a force loop or force feedback is provided within the detection element. The wear adjustment elements and the respective detection element accordingly form a self-enclosed unit with respect to forces and there is low risk that individual components will vibrate against one another due to the relatively small masses. Relative movements of the wear adjustment elements and/or the detection element, for example, relative to the pressure plate, do not produce an unwanted wear adjustment because the detection element is not fixedly tied to the pressure plate, as is the case in the prior art. Rather, the detection element according to the present invention is supported at the wear adjustment device.

According to a preferred embodiment of the present invention, the first application area and the second application area of the detection element are pretensioned toward one another. To provide the above-mentioned function of generating a force feedback in a simple manner via the detection element, the detection element may comprise a spring clamp element having first and second leg areas in which the first application area is arranged on the first leg area and the second application area is arranged on the second leg area. Furthermore, the detection portion of the detection element may be provided at the first leg area.

To introduce the force of the energy accumulator in a simple and reliably operating manner, the first adjustment element is supported at a component of the energy accumulator and acts on the second adjustment element. It is preferably provided that the first adjustment element is acted upon by the first application area, i.e., by the leg area of the detection element at which the detection portion is also provided.

To achieve defined movement states when carrying out wear adjustment, one of the adjustment elements is essentially not movable with respect to the first component when the relative adjustment movement is carried out in the wear adjustment movement direction. In the preferred embodiment, the first adjustment element which is also acted upon by the energy accumulator is blocked against movement.

Thrust plate assemblies of the type described above must be constructed in such a way that no imbalance exists during rotary operation. This also means that while wear compensation is carried out the various structural component parts cannot shift in such a way that imbalance is created by carrying out wear compensation. For this purpose, it is suggested that the at least one detection element is held at the first component so as to prevent movement in a wear adjustment movement direction corresponding to the relative adjusting movement. For example, the wear adjustment movement direction can be a circumferential movement direction.

According to a preferred embodiment, when the one adjustment element is prevented from moving in the wear adjustment movement direction, the other adjustment element is blocked by the at least one detection element to prevent movement.

The pretensioning of the adjustment elements for carrying out the relative adjusting movement in a wear adjustment movement direction may be generated by at least one adjusting pretensioning spring. The at least one adjusting pretensioning spring may have one side acting on one of the adjustment elements and the other side acting at another of the adjustment elements or the one component of the pressure plate and the housing. In the embodiment in which the at least one adjusting pretensioning spring acts at respective adjustment elements, the wear adjustment device and the detection element may be arranged as a subassembly which is also completely self-contained in this respect and which finally requires no special coupling to other subassemblies with the exception of the detection portion which must cooperate with a component that moves with respect to another component when wear occurs.

The wear adjustment device comprises two adjustment elements according to the preferred embodiment of the present invention. Each of the two adjustment elements have surfaces that are inclined with respect to a wear adjustment movement direction and are arranged as adjustment rings which contact one another.

In the thrust plate assembly according to the present invention, the second component comprises the housing, a component connected with the housing, or the energy accumulator.

The present invention is further directed to a wear adjustment module, especially for a friction clutch with automatic wear compensation, having at least one adjustment element group with at least two adjustment elements, at least one detection element which acts by a first application area upon one of the adjustment elements of the at least two adjustment elements and acts by a second application area upon another adjustment elements of the at least two adjustment elements and pretensions these adjustment elements relative to one another such that they are blocked to prevent execution of a relative adjusting movement with respect to one another.

A wear adjustment module of this type also ensures that it generates, in itself, a complete force feedback. The wear adjustment module can be added as an assembled component group to a thrust assembly in an assembly process. The risk of an unwanted release of the wear adjustment device cannot occur when oscillatory excitations or vibrations occur because of the complete force feedback within the wear adjustment module.

Also, the wear adjustment module may also include at least one adjusting pretensioning spring for pretensioning the adjustment elements of a respective group of adjustment elements with respect to one another for carrying out the relative adjustment movement.

In this regard, the at least one adjusting pretensioning spring has one coupling area that acts at one of the adjustment elements and another coupling area that acts at another of the adjustment elements of this group or that is arranged for acting upon another component.

The wear adjustment module further comprises a stopping element associated with at least one detection element which cooperates with this detection element for stopping the detection element in a position in which at least one of the adjustment elements of a respective group of adjustment elements is not acted upon to ensure that the detection element remains in the position corresponding to wear when wear occurs. The stopping element allows an adjusting movement to be subsequently performed.

The stopping element is preferably pretensioned in a stopping direction with respect to the detection element.

The present invention is further directed to a friction clutch which has a thrust plate assembly according to the present invention and a wear adjustment module according to the present invention.

The present invention is further directed to a process for assembling a thrust plate assembly using the wear adjustment module described above, wherein the process comprises the following steps:

a) assembling the wear adjustment module;

b) arranging the wear adjustment module at an energy accumulator or a component of one of the housing and the pressure plate;

c) connecting of the constructional unit obtained in step b) with the others of the housing, the pressure plate, and the energy accumulator.

In step b), the wear adjustment module may be coupled with the energy accumulator in the area of a detection portion of the at least one detection element to obtain the constructional unit.

Further, it is possible that in step b) the second coupling area of the at least one adjusting pretensioning spring is arranged at the first component to obtain the constructional unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
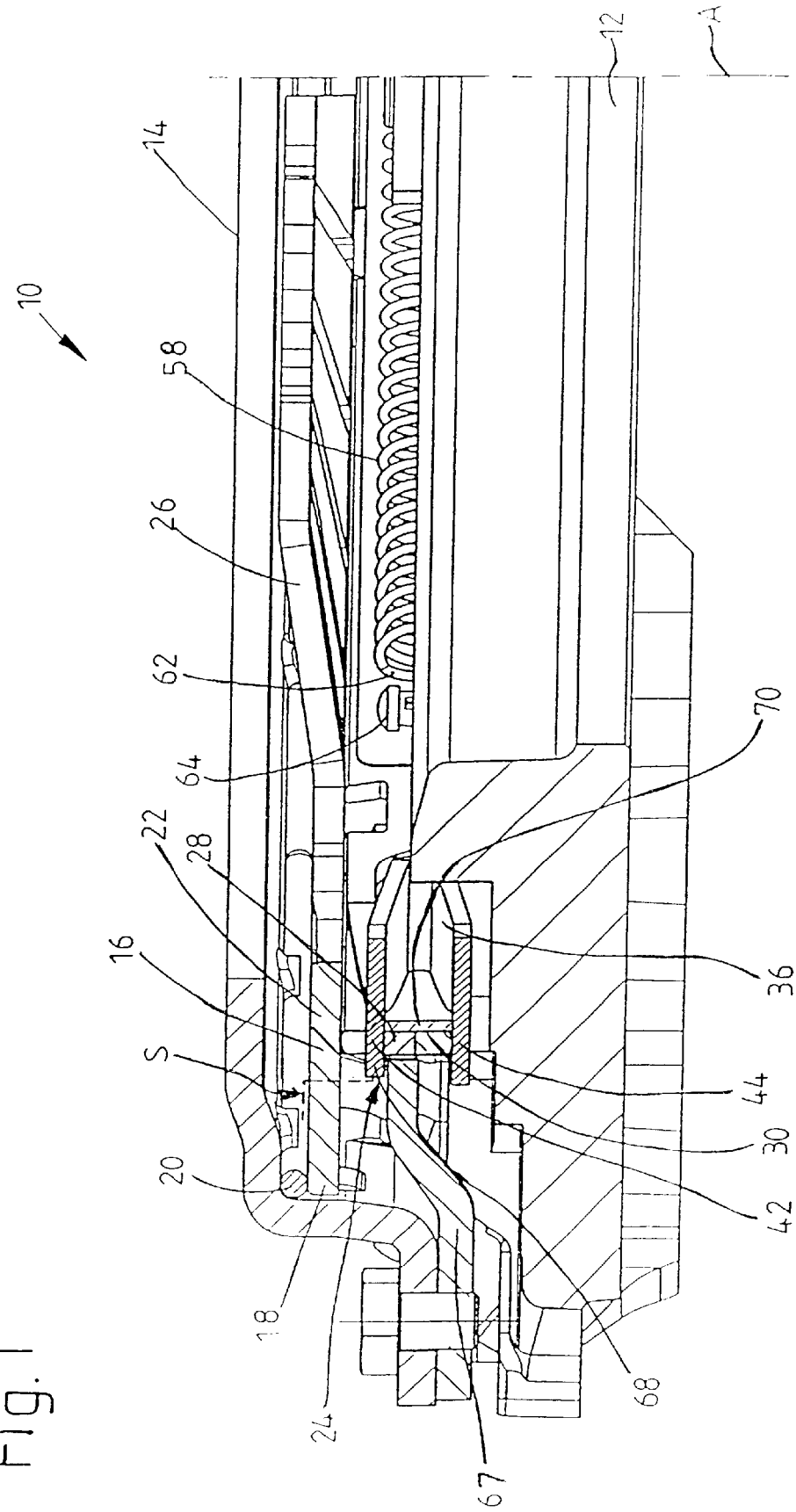
FIG. 1 is a partial longitudinal sectional view of a thrust plate assembly according to the present invention.

FIGS. 1 to 6 show a thrust plate assembly 10 according to the present invention. The thrust plate assembly 10 includes a pressure plate 12 arranged in a housing 14 and connected with the housing 14 via connecting elements (e.g., by tangential leaf springs or the like), not shown, so that the pressure plate 12 is fixed with respect to rotation relative to the housing 14, but axially movable relative to the housing 14. The housing 14 fixedly connectable, in a manner known per se, with a flywheel of a friction clutch, so that the friction linings of a clutch disk, not shown, may be clamped between the pressure plate 12 and the flywheel.

A diaphragm spring 16 is arranged inside the housing 14 as an energy accumulator. A radial outer area 18 of the diaphragm spring 16 is supported via a supporting ring 20 at the housing 14 and an area 22 of the diaphragm spring 16 located farther radially inward acts on a wear adjustment device 24 to be described in the following. The wear adjustment device 24 is supported in turn at the pressure plate 12 so that the diaphragm spring 16 presses the pressure plate 12 toward the flywheel, i.e., away from the housing 14, via the wear adjustment device 24. A radial inner area of the diaphragm spring 16 has spring tongues 26 which can be pulled by a clutch release to lessen the extent to which the diaphragm spring 16 acts upon the wear adjustment device 24 for carrying out the release processes. It is noted that a pull-type clutch is described. However, the basic construction described hereinafter for carrying out the wear compensation may also be incorporated in a push-type clutch in which the diaphragm spring 16 is supported at the housing 14 radially inside of the area of application of the wear adjustment device 24.

Figure 2:
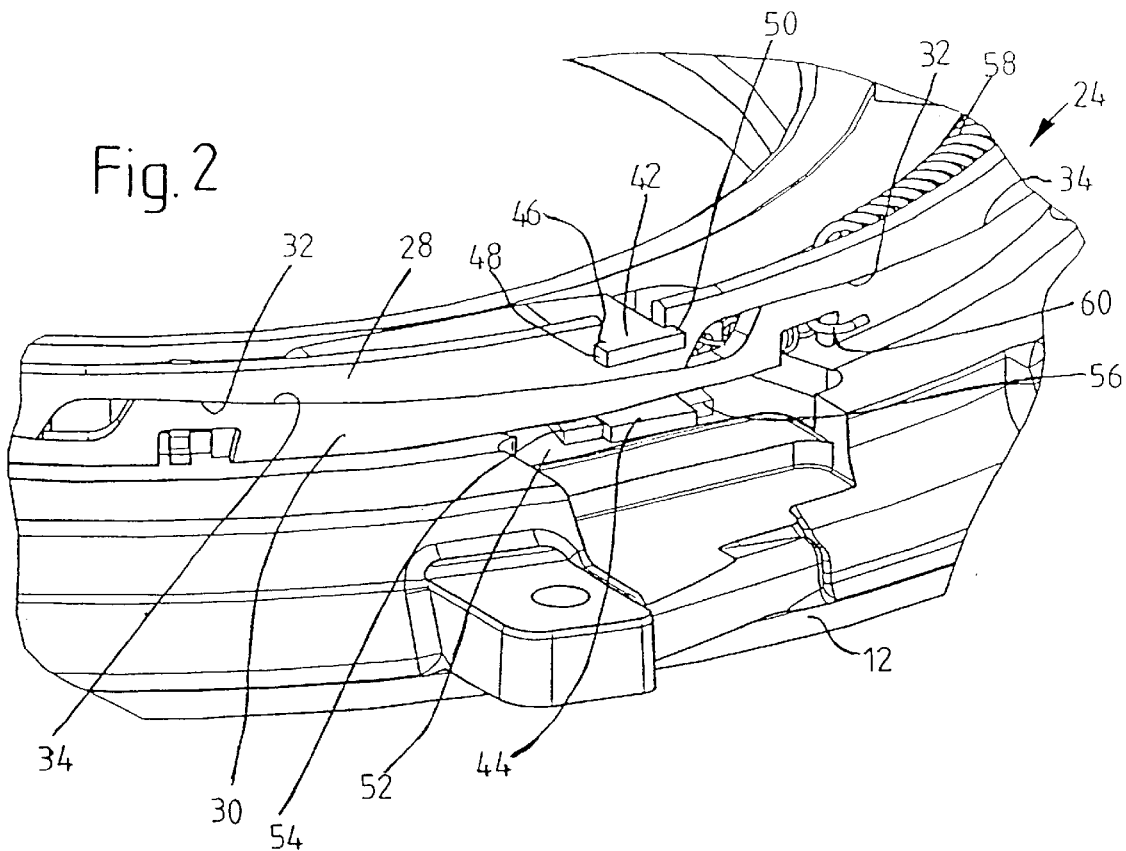
FIG. 2 is a partial perspective view of the thrust plate assembly of FIG. 1 from the radial outside.
Figure 3:
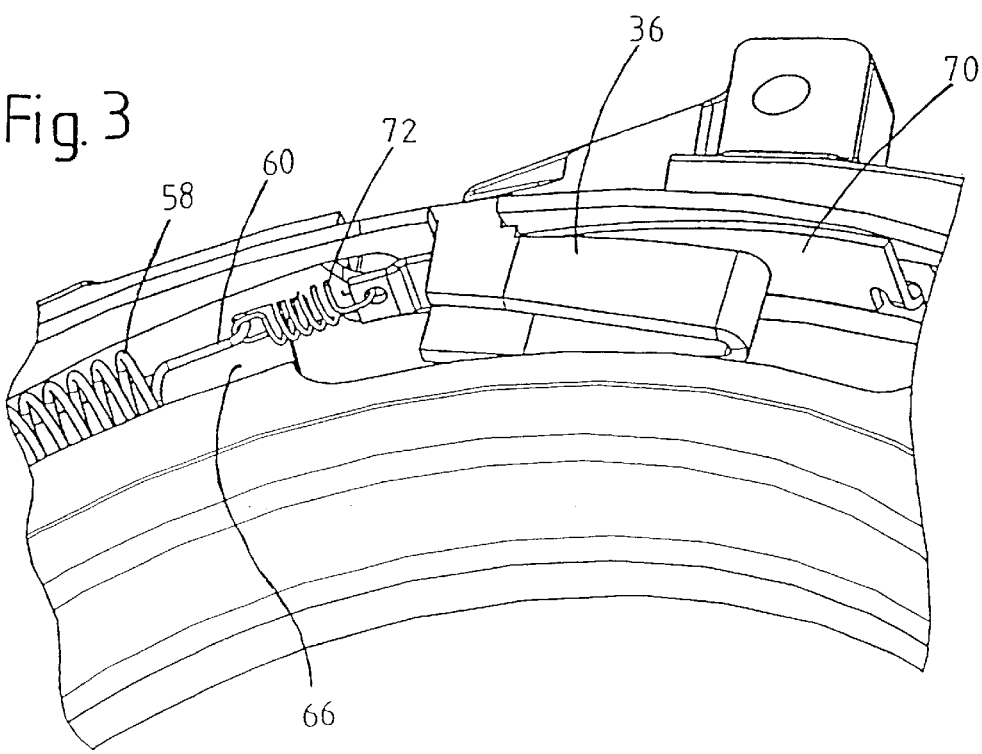
FIG. 3 is a partial perspective view of the thrust plate assembly of FIG. 1 from the radial inside.
Figure 4:
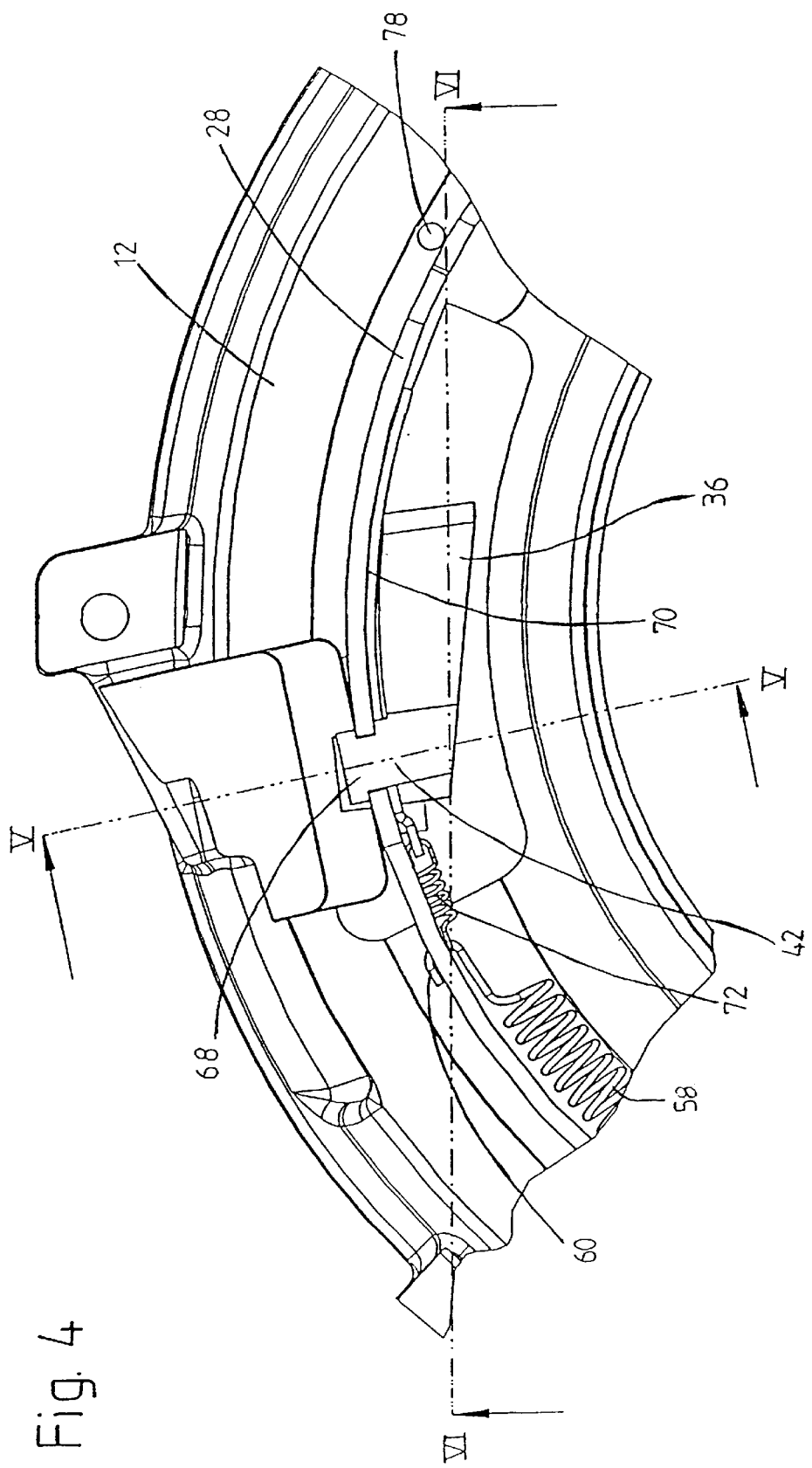
FIG. 4 is a top view of part of the thrust plate assembly shown in FIG. 1 without the housing and diaphragm spring.
Figure 5:
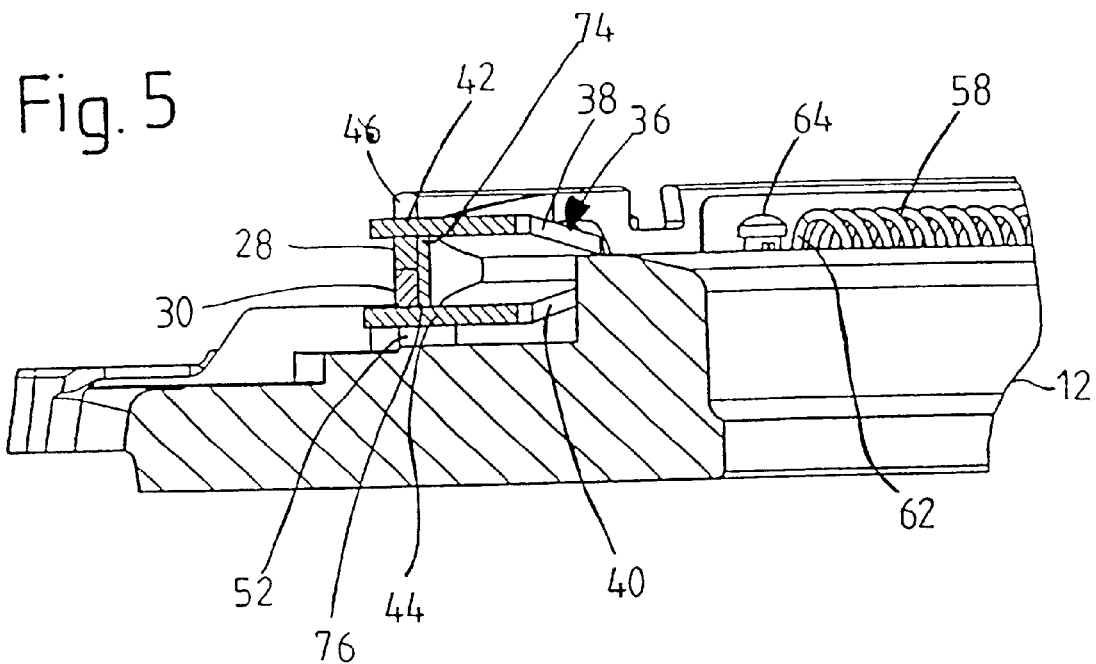
FIG. 5 is a sectional view of the thrust plate assembly along line V—V in FIG. 4.
Figure 6:
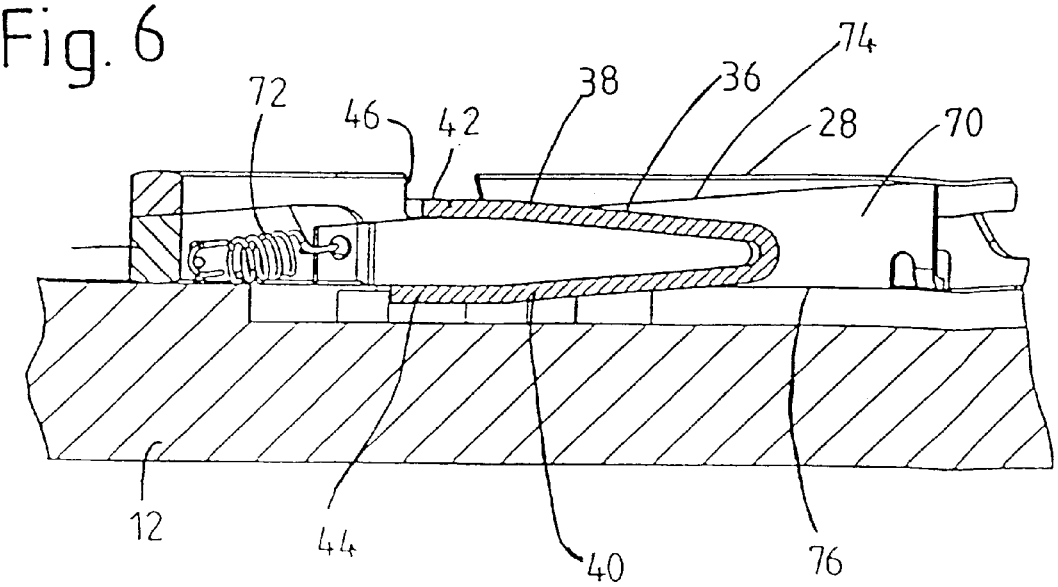
FIG. 6 is a sectional view of the thrust plate assembly along line VI—VI in FIG. 4.

As shown in FIGS. 2 and 3, the wear adjustment device 24 comprises first and second adjustment rings 28, 30. The first adjustment ring 28 is the adjustment ring at which the area 22 of the diaphragm spring 16 is supported and the second adjustment ring 30 is the adjustment ring resting on the pressure plate 12. FIG. 2 shows that the first and second adjustment rings 28, 30 have mutually complementary inclined surfaces 32, 34 via which the first and second adjustment rings 28, 30 contact one another. A relative rotation of the first and second adjustment rings 28, 30 with respect to one another increases the total axial extension of the wear adjustment device 24 to compensate for wear occurring, for example, in the area of the friction facings of the clutch disk. To achieve this increase in the axial extension, the second adjustment ring 30 contacting the pressure plate 12 is moved in a circumferential direction and to the right, for example, in the view in FIG. 2, while the first adjustment ring 28 is held stationary.

A play sensor comprising a detection element 36 is associated with the wear adjustment device 24. As will also be seen mainly in FIG. 6, the detection element 36 is a clamp spring element which is bent in a substantially U-shaped or V-shaped manner and may, for example, be made of spring steel. The detection element 36 has two leg areas 38, 40 on which first and second application areas 42, 44 are respectively arranged. The first application area 42 of the leg area 38 acts on the side of the first adjustment ring 28 facing the diaphragm spring 16 and the second application area 44 of the other leg area 40 acts on the side of the second adjustment ring 30 facing the pressure plate 12. Accordingly, the first and second adjustment rings 28, 30 are clamped between the two application areas 42, 44 which are pretensioned toward one another by a spring elasticity of the detection element 36.

It will be seen that the application areas 42, 44 are portions that protrude laterally from the leg areas 38, 40 and project radially outward, while the leg areas 38, 40 of the detection element 36 are generally located radially inside the first and second adjustment rings 28, 30 and extend essentially in a circumferential direction. A recess 46 is formed in the first adjustment ring 28 in which the first application area 42 engages such that the first application area 42 is fixedly connected with the first adjustment ring 28 in a circumferential direction. Further, the first application area 42 has lateral locating portions 48, 50 which ensure that the detection element 36 is held at the wear adjustment device 24 in a radial direction.

The second application area 44 is located in the area of a depression 52 of the pressure plate 12 and is held therein by lateral locating portions 54, 56 to prevent movement of the second application area 44 in a circumferential direction relative to the pressure plate 12. Accordingly, these locating portions 54, 56 fastened to the pressure plate 12 with the second application area 44 prevent the remainder of the detection element 36 and therefore the first adjustment ring 28 from moving with respect to the pressure plate 12 in the circumferential direction, i.e., in the wear adjustment movement direction described above. Therefore, only the second adjustment ring 30 is movable for performing wear compensation in the circumferential direction, that is, in the wear adjustment movement direction. An adjusting pretensioning spring 58 is arranged for providing the relative movement of the second adjustment ring 30. The adjusting pretensioning spring 58 has a first end area 60 suspended at the second adjustment ring 30. A second end area 62 (see FIG. 1) of the adjusting pretensioning spring 58 may, for example, be suspended at a projection 64 provided at the pressure plate 12. The adjusting pretensioning spring 58 is located in a trough-like depression 66 so that it assumes approximately a circumferential extension configuration. The first and second adjustment rings 28, 30 are pretensioned with respect to one another by this adjusting pretensioning spring 58 to carry out a relative adjusting movement, namely, because the first adjustment ring 28 is held with respect to the pressure plate 12 as was described above and because the second adjustment ring 30 is pretensioned or biased toward rotation with respect to the pressure plate 12.

It should be noted that, of course, instead of the second end 62 being coupled to the pressure plate 12, the second end 62 of the adjusting pretensioning spring 58 may also act directly on the first adjustment ring 28 so that a complete decoupling from the pressure plate 12 in conformity with a subassembly is also achieved in this case. It is further noted that instead of one adjusting pretensioning ring 58, a plurality of adjusting pretensioning rings may, of course, also be distributed in circumferential direction. Correspondingly, a plurality of detection elements 36 may also be distributed along the circumferential direction. However, it is sufficient for functioning, as will be described in detail in the following, to provide an individual detection element 36.

A blocking element 67 associated with the detection element 36 is provided at the housing 14 of the thrust plate assembly 10. The blocking element 67 is located in a circumferential area in which the application areas 42, 44 are also located and extends radially inward such that the blocking element overlaps a detection portion 68 of the detection element 36 in both the radial and circumferential directions. The detection portion 68 is formed in the first application area 42 of the detection element 36. The blocking element 67 is screwed to the housing 14 in the embodiment form shown in the Figures. However, a projection which is bent away from the housing 14 may also assume the function of the blocking element 67.

When wear occurs, for example, in the area of the friction facings of a clutch disk during operation of a friction clutch which is outfitted with a thrust plate assembly 10, the pressure plate 12 moves closer to the flywheel, i.e., moves somewhat farther away from the housing 14. As the pressure plate 12 moves away from the housing 14, the detection portion 68 approaches the blocking element 67 which projects radially inward. As wear progresses further, the detection portion 68 strikes the blocking element 67 and can no longer move along with the pressure plate 12 away from the housing 14. As the wear continues still, the detection portion 68 and the first application area 42 located directly adjacent are kept stationary in relation to the housing 14, while the first and second adjustment rings 28, 30 and the pressure plate 12 continue moving away from the housing 14 under the force exerted by the diaphragm spring 16. Accordingly, an intermediate space is formed in the axial direction between the first application area 42 and the first adjustment ring 28. However, since the diaphragm spring 16 continues to act upon the wear adjustment device 24 in this state, a wear adjustment movement does not yet occur. To ensure that a wear adjustment will occur during a subsequent releasing movement, the first application area 42 must be prevented from contacting the adjustment ring 28 during the backward movement of the pressure plate 12 which occurs during the releasing process. For this purpose, a stopping element 70 having a wedge-shaped construction is associated with the detection element 36. The stopping element 70 is arranged radially inside of the first and second adjustment rings 28, 30 and extends along the circumferential direction between the two application areas 42, 44. One end area of the stopping element 70 is attached to the first end of a pretensioning spring 72. The other end of the pretensioning spring 72 is supported at and fastened to the first end 60 of the adjusting pretensioning spring 58. Accordingly, the stopping element 70 is pretensioned in circumferential direction in a stopping direction in which it pulled by its increasingly large axial extension into the area between the two application areas 42, 44. When the first application area 42 is raised from the first adjustment ring 28, the two leg areas 38, 40 of the detection element 36 are spread apart and the stopping element 70 which is pretensioned by the pretensioning spring 72 moves into this axial intermediate space that is created. The stopping element 70 has two wedge faces 74, 76 facing in opposite axial directions which come into contact again with the application areas 42, 44 under the urgency of the pretensioning spring 72. Accordingly, the stopping element 70 prevents the detection element 36 from moving back against its pretensioning during a subsequent release process. After the release process, the detection portion 68 of the detection element 36 is raised again from the blocking element 67, so that the wear adjustment device 24 is no longer blocked by the detection element 36 against movement in the wear adjustment movement direction when a releasing process is executed. Accordingly, when the release process is initiated, the diaphragm spring 16 releases the first adjustment ring 28 which allows the pressure plate 12 to be axially adjusted by the tangential leaf springs which connect the pressure plate 12 to the housing 14. The appreciably greater pretensioning force of the adjusting pretensioning spring 58 relative to the tangential leaf springs permit a rotation of the second adjustment ring 30 against this action of the tangential leaf springs so that the axial extension of the wear adjustment device 24 increases due to the relative adjusting movement of the first and second adjustment rings 28, 30, as was already mentioned in the beginning, until the first adjustment ring 28 again axially strikes against the first application area 42. In this way, the exact wear distance by which the pressure plate 12 previously moved axially from the housing 14 is compensated for. During a subsequent engagement process, the same installation situation that existed in the new state without wear exists for the diaphragm spring 16, so that the installation position of the diaphragm spring 16 does not change when wear occurs.

The thrust plate assembly 10 according to the present invention has the advantage that the pretensioning forces or application forces occurring in the area of wear adjustment are contained essentially completely within the thrust plate assembly. That is, the detection element 36 is supported at the two axial sides of the first and second adjustment rings 28, 30 and accordingly creates a force feedback via the first and second adjustment rings 28, 30. If oscillatory excitations occur in rotary operation, especially in the released state, the detection-element 36 could move axially with respect to the pressure plate 12 without risking the occurrence of an unwanted adjusting movement.

According to the preceding description, the wear adjustment device 24 with the first and second adjustment rings 28, 30, the detection element 36, and the pretensioning springs 58, 52, form a wear adjustment module which may be preassembled before being put together with the entire thrust plate assembly 10. Furthermore, the wear adjustment module may be installed in this preassembled state. Since no additional connection to the thrust plate assembly is required for this wear adjustment module aside from the axial application by the pressure plate 12 and the diaphragm spring 16, retaining pins 78 are arranged on the pressure plate 12 and distributed about the circumference so that they directly adjoin the radial outer sides of the adjustment rings 28, 30 and extend axially away from the pressure plate 12 to provide for a suitable centering of the adjustment rings 28, 30 relative to the pressure plate 12. The locating projections 54, 56 provide a position preset for positioning the wear adjustment module in the circumferential direction. This self-contained modular construction may be achieved when the first and second end areas 60, 62 of the adjusting pretensioning spring 58 are respectfully supported at the first and second adjustment rings 28 and 30.

A modification of the embodiment form described above is indicated by a dashed line S in FIG. 1. In the modification, the detection portion 68, as indicated by the dashed line S, is bent toward the diaphragm spring 26, penetrates an opening in the diaphragm spring 16, and engages behind the diaphragm spring 16 at the side of the same remote of the pressure plate 12. Accordingly, in this modified embodiment, the blocking element 67 is replaced by the diaphragm spring 16. In this embodiment, the detection portion 68 is part of the pressure plate 12 with the subassemblies provided thereon which moves relative to the diaphragm spring 16 when wear occurs. As the area of the detection of the occurring wear relative to the diaphragm spring 16 moves closer to the area at which the diaphragm spring 16 is supported relative to the housing 14, the amount of the relative movement between the detection portion 68 and diaphragm spring 16 corresponds to the amount of the movement between the detection portion 68 and the housing 14. This alternative embodiment is particularly advantageous with a modular construction because the entire wear adjustment device module including the adjustment rings 28, 30, the detection element or detection elements 36, the springs 58, 72 and the stopping element 70 can first be assembled as subunit which can then be anchored with the detection portions 68 at the diaphragm spring 16 and can finally be integrated in the thrust plate assembly along with the diaphragm spring 16. The process of assembly can be appreciably facilitated in this way.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A thrust plate assembly for a friction clutch with automatic wear compensation, comprising:
   a housing arranged for rotation about an axis of rotation;
   a pressure plate arranged in said housing and operatively connected to said housing so that said pressure plate is fixed with respect to rotation relative to said housing and axially displaceable relative to said housing;
   an energy accumulator having one side supported on said housing and another side supported on said pressure plate;
   a wear adjustment device arranged in a support path of said energy accumulator between said energy accumulator and a first component on one of said housing and said pressure plate, said wear adjustment device comprising first and second adjustment elements pretensioned for urging said first and second adjustment elements in a relative adjusting movement in a wear adjustment movement direction;
   a play sensor arrangement comprising a detection element operatively arrangeable in a first position relative to said wear adjustment device for preventing said relative adjusting movement, wherein said detection element comprises a first application area for acting on said first adjustment element and a second application area for acting on said second adjustment element and wherein the relative adjusting movement of said first and second adjustment elements is prevented when said first and second application areas respectively act on said first and second adjustment elements;
   a second component displaceable relative to said first component in response to wear of the friction clutch, wherein said detection element comprises a detection portion operatively arranged for interacting with said second component for detecting the wear, said detection element moving to a second position relative to said wear adjustment device in response to the wear for releasing the first and second adjustment elements and thereby allowing the relative adjusting movement of said wear adjustment device; and
   a stopping element arranged for stopping said detection element in said second position.

2. The thrust plate assembly of claim 1, wherein said first application area and said second application area are pretensioned toward one another.

3. The thrust plate assembly of claim 2, wherein said detection element comprises a spring clamp element having a first leg area and a second leg area, said first application area being arranged in said first leg area and said second application area being arranged in said second leg area.

4. The thrust plate assembly of claim 3, wherein said detection portion is arranged at said first leg area.

5. The thrust plate assembly of claim 1, wherein said second adjustment element is supported at said first component and said first adjustment element is supported on said energy accumulator.

6. The thrust plate assembly of claim 5, wherein said detection element comprises a spring clamp element having a first leg area and a second leg area, said first application area and said detection portion being arranged in said first leg area and said second application area being arranged in said second leg area, and wherein said first application area is arranged for acting on said first adjustment element.

7. The thrust plate assembly of claim 1, wherein one of said first and second adjustment elements is stationary relative to said first component when the relative adjustment movement is effected in the wear adjustment movement direction.

8. The thrust plate assembly of claim 7, wherein said second adjustment element is supported at said first component and said first adjustment element is supported on said energy accumulator, said detection element comprises a spring clamp element having a first leg area and a second leg area, said first application area and said detection portion being arranged in said first leg area and said second application area being arranged in said second leg area, and wherein said first application area is arranged for acting on said first adjustment element and said first adjustment element is blocked against movement relative to said detection element.

9. Thrust plate assembly of claim 1, wherein said detection element is held at said first component to prevent movement in the wear adjustment movement direction corresponding to the relative adjusting movement.

10. The thrust plate assembly of claim 9, wherein the wear adjustment movement direction is a circumferential movement direction.

11. Thrust plate assembly according to claim 10, wherein said second adjustment element is supported at said first component and said first adjustment element is supported on said energy accumulator, said detection element comprises a spring clamp element having a first leg area and a second leg area, said first application area and said detection portion being arranged in said first leg area and said second application area being arranged in said second leg area, and wherein said first application area is arranged for acting on said first adjustment element, said first adjustment element being blocked against movement by said detection element when the relative adjustment movement is effected in the wear adjustment movement direction.

12. The thrust plate assembly of claim 1, further comprising an adjusting pretensioning spring operatively arranged for pretensioning said first and second adjustment elements for effecting the relative adjusting movement in the wear adjustment movement direction.

13. The thrust plate assembly of claim 12, wherein said adjusting pretensioning spring comprises one side operatively arranged for acting on said second adjustment element and another side operatively arranged for acting on one of said first adjustment element and said first component.

14. The thrust plate assembly of claim 1, wherein said first and second adjustment elements each have inclined surfaces with respect to a wear adjustment movement direction which contact one another, said first and second adjustment elements comprising first and second adjustment rings.

15. The thrust plate assembly of claim 1, wherein said second component comprises one of said housing, a component connected with said housing, and a component connected to said energy accumulator.

16. A wear adjustment module for a friction clutch with automatic wear compensation, comprising:
    an adjustment element group comprising first and second adjustment elements; and
    a detection element having a first application area arranged for acting upon said first adjustment element and a second application area arranged for acting upon said second adjustment element, wherein said detection element is operatively arranged for pretensioning said first and second adjustment elements relative to one another such that they are blocked to prevent execution of a relative adjusting movement with respect to one another.

17. The wear adjustment module of claim 16, further comprising an adjusting pretensioning spring one of operatively arranged and arrangeable for pretensioning said first and second adjustment elements in a direction for effecting a relative adjustment movement.

18. The wear adjustment module of claim 17, wherein said adjusting pretensioning spring has a first coupling area operatively arranged for acting at said second adjustment element and a second coupling area operatively arranged for acting at one of said first adjustment element and another component of the friction clutch.

19. The wear adjustment module of claim 16, further comprising a stopping element operatively arranged for stopping said detection element in a position in which at least one of the first and second adjustment elements is not acted upon.

20. The wear adjustment module of claim 19, wherein said stopping element is pretensioned in a stopping direction with respect to said detection element for stopping said detection element in a position in which at least one of the first and second adjustment elements is not acted upon.

21. Friction clutch comprising a thrust plate assembly with automatic wear compensation, said thrust plate assembly comprising:
    a housing arranged for rotation about an axis of rotation;
    a pressure plate arranged in said housing and operatively connected to said housing so that said pressure plate is fixed with respect to rotation relative to said housing and axially displaceable relative to said housing;
    an energy accumulator having one side supported on said housing and another side supported on said pressure plate;
    a wear adjustment device arranged in a support path of said energy accumulator between said energy accumulator and a first component on one of said housing and said pressure plate, said wear adjustment device comprising first and second adjustment elements pretensioned for urging said first and second adjustment elements in a relative adjusting movement in a wear adjustment movement direction;
    a play sensor arrangement comprising a detection element operatively arrangeable in a first position relative to said wear adjustment device for preventing said relative adjusting movement, wherein said detection element comprises a first application area for acting on said first adjustment element and a second application area for acting on said second adjustment element and wherein the relative adjusting movement of said first and second adjustment elements is prevented when said first and second application areas respectively act on said first and second adjustment elements.;
    a second component displaceable relative to said first component in response to wear of the friction clutch, wherein said detection element comprises a detection portion operatively arranged for interacting with said second component for detecting the wear, said detection element moving to a second position relative to said wear adjustment device in response to the wear for releasing the first and second adjustment elements and thereby allowing the relative adjusting movement of said wear adjustment device; and
    a stopping element arranged for stopping said detection element in said second position.

22. A process for assembling a thrust plate assembly for a friction clutch with automatic wear compensation, comprising the steps of:

(a) assembling a wear adjustment module comprising an adjustment element group comprising first and second adjustment elements and a detection element having a first application area arranged for acting upon the first adjustment element and a second application area arranged for acting upon the second adjustment element, wherein the detection element is operatively arranged for pretensioning the first and second adjustment elements relative to one another such that they are blocked to prevent execution of a relative adjusting movement with respect to one another;

(b) arranging of the wear adjustment module assembled in said step (a) at one of a pressure plate and an energy accumulator of the friction clutch; and (c) connecting the constructional unit obtained in step (b) with the housing and the other of the pressure plate and the energy accumulator.

23. The process of claim 22, wherein said step (b) comprises coupling the wear adjustment module with the energy accumulator in the area of a detection portion of the detection element to obtain the constructional unit.

24. The process of claim 22, wherein said step (b) comprises arranging the second coupling area of the adjusting pretensioning spring at the pressure plate to obtain the constructional unit.

* * * * *